United States Patent Office 3,575,985
Patented Apr. 20, 1971

3,575,985
PYRIDINIUM COMPOUNDS
Alexander Crawford Ritchie, Eric Eastwood, and Peter Garside, London, England, assignors to Allen and Hanburys Limited, London, England
No Drawing. Filed June 26, 1967, Ser. No. 648,983
Claims priority, application Great Britain, June 28, 1966, 28,898/66
Int. Cl. C07d 31/22
U.S. Cl. 260—290                                        11 Claims

ABSTRACT OF THE DISCLOSURE

Novel pyridinium salts are disclosed having an effect on the cardiovascular and nervous systems.

They are prepared by reaction of pyridine compounds with organic halides and related compounds. There is also disclosure of pharmaceutical compositions containing the pyridinium salts.

---

This invention relates to novel heterocyclic compounds having an effect upon the cardiovascular and nervous systems for example possessing antihypertensive activity and able to block or stimulate autonomic ganglia and to compositions containing the same.

The present invention provides pyridinium salts of the general formula:

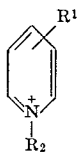

in which:

$R_1$ represents an unsubstituted phenyl radical or a phenyl radical substituted by one or more alkyl, alkoxy, hydroxy, nitro, amino, alkylamino, aralkyl or trifluoromethyl radicals or by one or more halogen atoms;

$R_2$ represents an alkyl radical (except where $R_1$ is an unsubstituted phenyl radical $R_2$ is not a methyl radical) or an alkenyl, alkynyl, aralkyl, aryl or heterocyclic radical or a radical of the general formula:

Alk Y in which:

Alk represents a branched or straight chain alkylene radical containing from 1 to 6 carbon atoms and,
Y represents a halogen atom or a group of the formula:

—$COR_3$ in which:

$R_3$ represents an alkyl, hydroxy, alkoxy, amino or alkylamino radical, or a group of the formula:

—$OR_4$ in which:

$R_4$ represents a hydrogen atom or an alkyl, aralkyl or aryl radical or
Y represents a group of the formula:

—$NR_5R_6$ in which:

$R_5$ and $R_6$ which may be the same or different represent hydrogen atoms or alkyl, aryl or aralkyl radicals, and in which Z represents a pharmaceutically acceptable anion, and inner salts thereof formed by spontaneous cyclisation of such compounds.

Examples of pharmaceutically acceptable anions include the chloride, iodide, bromide, acetate bicarbonate, succinate, maleate, tartrate, methanesulphonate and methosulphate anion.

As indicated above the pyridinium salts react spontaneously to form inner salts and the invention extends to such inner salts. The preparation of such an inner salt is described in Example 7 where the pyridinium salt which is prepared initially reacts spontaneously to form an inner salt of the formula:

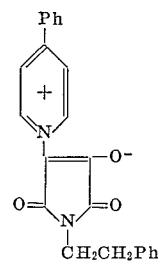

in such cases the anion of the pyridinium salt is represented by the group $R_2$ which has undergone further reaction.

Preferred compounds according to the invention are those in which $R_1$ represents a phenyl group optionally substituted by one or more methyl, methoxy, hydroxy or halide substituents. Preferably $R_2$ represents an alkyl, alkenyl or alkynyl radical containing from 1 to 3 carbon atoms an aralkyl radical containing from 1 to 3 carbon atoms in the alkyl portion of the radical, a nitro group substituted phenyl radical, a 1-phenethyl-4-hydroxy2,5-dioxopyrrolin-3-yl radical a radical of the formula $CH_2COCH_3$ or of the formula $CH_2COOH$ or of the formula $CH_2COOEt$ or of the formula $CH_2CH_2OX$ in which X represents a hydrogen atom or a phenyl radical or a radical of the formula

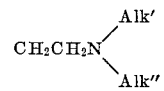

in which Alk' and Alk" are alkyl groups containing from 1 to 3 carbon atoms. Specific preferred compounds are those the production of which is described in the examples. Compounds of Formula I may be prepared by reacting a substituted pyridine compound of the formula:

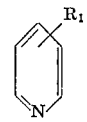
III in which $R_1$ has the meaning given above, with a compound of the general formula:

X—$R_2$                     IV in which the radical $R_2$ has the meaning given above and X may be chlorine, bromine or iodine atom. The reaction may be carried out in the presence of an inert solvent, preferred solvents being methyl ethyl ketone and methanol and may take place without heating or the reactants may be refluxed together to give the desired product. Where X in Formula IV is a chlorine or bromine atom, it is preferable to add a quantity of sodium iodide to the reaction mixture. In such cases the product is obtained as the iodide.

The compounds of Formula I in which $R_2$ is AlkCOOH may be prepared by hydrolysis of the corresponding ester.

Other compounds according to the invention may also be prepared by further treatment of compounds according to the invention prepared by the general method given above. Examples of such further treatment steps include the conversion of methoxy groups to hydroxy groups in the preparation of the compound in which $R_1$ is a hydroxy substituted phenyl group from the corresponding methoxy-substituted compound and the replacement of a nitro substituted phenyl group by an unsubstituted phenyl group in the preparation of the compound in which $R_2$ is phenyl from the compound in which it is 2,4-dinitrophenyl.

The compounds of the present invention are normally isolated from the reaction mixtures as the halides especially the iodides, and these salts may be converted into other desired salts in which the pharmaceutically acceptable anion Z is to be other than the halide anion initially present by conventional techniques such as metathesis.

The compounds of the present invention have been found to have useful biological activity. Thus, they produce an effect on the cardiovascular and nervous systems, for example they possess antihypertensive activity and block or stimulate autonomic ganglia. The compounds may be employed in the usual forms for therapeutic administration that is generally in association with an inert pharmaceutically acceptable carrier and the invention extends to pharmaceutical compositions containing one or more compounds according to the invention. The pharmaceutical compositions may for example, be formulated with a pharmaceutical carrier to provide orally and parenterally acceptable compositions, for example as tablets, capsules, suppositories, injection solutions and the like. A suitable dosage range is from 5 to 500 mgm. per day. Compositions in dosage unit form may contain a quantity of active ingredient within this range.

The following examples illustrate the invention.

EXAMPLE 1

Preparation of 4-phenyl-1-propylpyridinium iodide 10.3 g. of 4-phenylpyridine, 12.3 g. of n-propyl bromide, 14 g. of sodium iodide and 50 ml. of methyl ethyl ketone were heated at gentle reflux for one hour. The mixture was cooled and the solid was filtered off. On recrystallisation from isopropanol 9.0 g. of a pale yellow solid (4-phenyl-1-propylpyridinium iodide), M.P. 145–6° C. was obtained.

EXAMPLE 2

Preparation of 1-phenethyl-4-phenylpyridinium iodide 10.3 g. of 4-phenylpyridine, 18.5 of phenethyl bromide and 14 g. of sodium iodide were heated together in 50 ml. of methyl ethyl ketone for 1 hour. The mixture was evaporated to dryness and the residue crystallized from isopropanol to give 16.8 g. of a yellow crystalline solid (1-phenethyl-4-phenylpyridinium iodide), M.P. 166–7° C.

EXAMPLE 3

Preparation of 1-acetonyl-4-phenylpyridinium chloride 3.7 g. of chloroacetone was added to a solution of 6.3 g. of 4-phenylpyridine in 50 ml. of methyl ethyl ketone, and the mixture warmed for 15 minutes. The colourless solid was removed by filtration and recrystallised from ethyl acetate/methanol. 8.4 g. of 1-acetonyl-4-phenylpyridinium chloride was obtained as colourless crystals, M.P. 263° C.

EXAMPLE 4

Preparation of 1-carboxymethyl-4-phenylpyridinium bromide 6.4 g. of ethyl bromoacetate was added to a solution of 5 g. of 4-phenylpyridine in 40 ml. of methyl ethyl ketone. The mixture was stirred under reflux for 90 minutes, then cooled. The white solid which precipitated was then filtered off, and recrystallised from isopropanol methanol to give 9.05 g. of 1-carboxymethyl-4-phenylpyridinium bromide ethyl ester as colourless plates, M.P. 210–211° C.

5 g. of 1-carboxymethyl-4-phenylpyridinium bromide ethyl ester was dissolved in 74 ml. of 48% hydrobromic acid and refluxed for 4 hours. The solution was then evaporated to dryness under reduced pressure and dried in a vacuum dessicator over $P_2O_5$. The white crystals obtained were recrystallized from ethanol ether to give 3.6 g. of 1 carboxymethyl-4-phenylpyridinium bromide, as colourless crystals, M.P. 198–200° C.

EXAMPLE 5

Preparation of 4-(4-chlorophenyl)-1-methyl pyridinium iodide 6.0 g. 4-(4-chlorophenyl) pyridine in 50 ml. of acetone was treated with 5.0 g. of methyl iodide. The yellow solid which appeared was filtered off and was recrystallised from ethanol. 6.46 g. of a pale yellow solid of 4-(4-chlorophenyl)-1-methyl pyridinium iodide was obtained, M.P. 258–9° C.

EXAMPLE 6

Preparation of 1-(2,4-dinitrophenyl)-4-phenyl pyridinium chloride 8.2 g. of 1-chloro-2,4-dinitrobenzene was added to a solution of 5.0 g. of 4-phenylpyridine in 40 ml. of methyl ethyl ketone. The solution was distilled under reflux for 25 minutes, and the precipitate which formed (1-(2,4-dinitrophenyl)-4-phenylpyridinium chloride) was filtered off and recrystallised from methanol ethyl acetate to give 7.4 g. of the product, M.P. 184–5° C.

EXAMPLE 7

Preparation of 1-(1-phenethyl-4-chloro-2,5-dioxo-3-pyrrolin-3-yl)-4-phenylpyridinium chloride 14.8 g. of 4-phenylpyridine in 15 ml. of acetic acid was added to a solution of 5.4 g. of N-(2-phenylethyl) dichloromaleimide in 50 ml. of hot acetic acid. The mixture was heated at 100–110° C. for 2 hours, then chilled at 0° C. A yellow solid crystallized out, and was recrystallised from dimethyl formamide to give 4.3 g. of the product, M.P. 235–7° C.

Analysis showed that this product was 1-(1-phenethyl-4-hydroxy-2,5-dioxo-3-pyrrolin-3-yl)-4-phenyl pyridinium hydroxide, inner, salt. 1-(1-phenethyl-4-chloro 2,5-dioxo-3-pyrrolin-3-yl)-4-phenylpyridinium chloride is formed as an intermediate during the reaction but reacts further to give the inner salt.

EXAMPLE 8

Preparation of 1-benzyl-4-phenylpyridinium chloride 3 g. of a solution of 4-phenylpyridine and 5 ml. of benzyl chloride in 50 ml. of methanol were heated together under reflux for 12 hours. Removal of the volatile materials gave a yellow solid. On recrystallisation from methanol ethyl acetate 3 g. of 1-benzyl-4-phenylpyridinium chloride was obtained as buff coloured plates M.P. 258–259° C.

EXAMPLE 9

Preparation of 1-carboxymethyl-4-phenylpyridinium bromide, ethyl ester 5 g. of 4-phenylpyridine was dissolved in approximately 40 ml. of methyl ethyl ketone and 6.4 g. of ethyl bromoacetate was added. The mixture was stirred under reflux for 1½ hours. The mixture was cooled and the white solid which had precipitated was filtered and dried to give 9.8 g. of the solid, M.P. 227–230° C. Recrystallisation from isopropanol/methanol followed by washing with acetone and ether, and finally drying at 100° C. yielded 9.05 g. of colourless plates (1-carboxymethyl-4-phenylpyridinium bromide ethyl ester), M.P. 207–209° C.

EXAMPLE 10

Preparation of 1-allyl-4-phenylpyridinium iodide 10.3 g. of 4-phenylpyridine, 12.1 g. of allyl bromine, 14 g. of sodium iodide and 50 ml. of methyl ethyl ketone were heated together at gentle reflux for 1 hour, when T.L.C. (SiO$_2$/MeOH) indicated that no 4-phenyl pyridine remained unreacted.

The mixture was evaporated to dryness and the residue was recrystallised from isopropanol to give 17.8 g. of brownish-yellow crystalline solid, M.P. 128–9° C. Recrystallisation from isopropanol yielded 14.94 g. of a yellow crystalline solid, M.P. 129–30° C.

EXAMPLE 11

Preparation of 4(3,4-dimethoxyphenyl)-1-methyl pyridinium iodide 1.07 g. of 4(3,4-dimethoxy phenyl) pyridine and 1 ml. of methyl iodide were dissolved in 15 ml. of acetone and allowed to stand for 24 hours. 1.45 g. of the solid which came out of solution was filtered off, washed and dried, M.P. 235° C. This solid was recrystallised twice from 50 ml. ethanol to yield 1.05 g. of yellow platelets, M.P. 242° C.

EXAMPLE 12

Preparation of 1-ethyl-4-phenylpyridinium iodide 6.29 g. of ethyl iodide was added to a solution of 5 g. of 4-phenylpyridine in 20 ml. of methyl ethyl ketone and the solution heated under reflux for 2½ hours (thin layer chromatography, methyl ethyl ketone on Al$_2$O$_3$ shows when the reaction is complete). The solution was cooled, and 10.44 g. of the yellow precipitate M.P. 126–9° C. was filtered off from the solution. Recrystallisation of the yellow solid from isopropanol gave 8.3 g. of 1-ethyl-4-phenylpyridinium iodide as prisms, M.P. 130–2° C.

EXAMPLE 13

Preparation of 1-methyl-4-(p-tolyl)pyridinium iodide 3.5 ml. of methyl iodide was added to a solution of 2.5 g. of 4-(p-tolyl)pyridine in 30 ml. of acetone warmed and then allowed to stand for 2 hours. 3.3 g. of a yellow solid was filtered off, M.P. 171–2° C. This was recrystallised from 20 ml. of isopropyl acetate and 12 ml. of ethanol to give 2.7 g. of a yellow crystalline product M.P. 171–2° C.

EXAMPLE 14

Preparation of 1(2-phenoxyethyl)-4-phenyl-pyridinium bromide 10.3 g. of 4-phenylpyridine, 20 g. of phenoxyethyl bromide and methyl ethyl ketone were heated together at gentle reflux for 2 hours, when T.L.C. (SiO$_2$/MeOH) indicated that no 4-phenylpyridine remained in the mixture. The solvent was removed by distillation under reduced pressure, leaving a gum which solidified. This solid was dissolved in 30 ml. of ethanol and benzene was added until the mixture became slightly opalescent. The crystals which appeared on standing were filtered off, washed with benzene/alcohol and dried to give 4.6 g. of a white crystalline solid, M.P. 121–2° C.

EXAMPLE 15

Preparation of 1-isopropyl-4-phenylpyridinium iodide 6.94 g. of 2-iodopropane was added to a solution of 5 g. of 4-phenylpyridine in 20 ml. of methyl ethyl ketone, and the solution was heated on a steam bath, under reflux for 12 hours. The solution was concentrated, under reduced pressure, and recrystallisation of the yellow residue, from isopropanol ether gave 7.5 g. of 1-isopropyl-4-phenyl-pyridinium iodide, M.P. 105–7° C.

EXAMPLE 16

Preparation of 1-[2-(diethylamino)ethyl]-4-phenylpyridinium chloride 10 g. of a solution of 4-phenylpyridine in 40 ml. of acetone was added to a solution of 4.4 g. of 2-diethyl-amino ethyl chloride in 10 ml. of acetone. The reactants were heated under reflux for 24 hours. The mixture was cooled and 2.8 g. of the yellow precipitate was filtered off and dried. Recrystallisation from methanol ethyl acetate gave 2.0 g. of 1-[2-(diethylamine)ethyl]-4-phenylpyridinium chloride, M.P. 192.5–4° C.

EXAMPLE 17

Preparation of 4(3,4-dihydroxyphenyl)-1-methyl pyridinium chloride 6.0 g. of 4(3,4-dimethoxyphenyl)-1-methylpyridinium iodide, 18 ml. of glacial acetic acid, and 18 ml. of 48% aqueous hydrogen bromide were refluxed for 6 hours. The solution was boiled down to dryness in vacuo on a a steam bath. The residual solid was dissolved in 100 ml. of hot ethanol and the solution concentrated to about 25 ml. and cooled. 5.3 g. of the solid which crystallised out was filtered off and dried, M.P. 245° C. This solid was found to contain both iodide and bromide ions, and was converted to the chloride as follows:

Silver chloride, freshly prepared from 4.7 g. of silver nitrate, was refluxed and stirred for 6 hours in the absence of light, with a solution of the mixed metho bromide and methiodide of 5.3 g. of 4(3,4-dihydroxyphenyl)pyridine, in 45 ml. of methanol. The silver salts were filtered off on a hyflo pad from the warm suspension, and thoroughly washed with hot methanol. The filtrates were combined and boiled down to dryness. The residual solid was dissolved in 350 ml. ethanol and refluxed with 1 g. of charcoal. After hot filtration, the filtrate was evaporated on a steam bath until 200 ml. of distillate had been collected. On cooling some solid crystallised out. This was filtered off and dried to give 3.58 g. of solid, M.P. 232–4° C. This solid was recrystallised by dissolving it in 400 ml. of hot ethanol, boiling off 300 ml. and cooling to yield 1.6 g. of a yellow solid, M.P. 234–6° C. A second crop was obtained by concentrating the filtrate down further and cooling to give 0.8 g. of solid, M.P. 234–6° C.

EXAMPLE 18

Preparation of 1,4-diphenylpyridinium chloride 7.8 g. of aniline was added to a solution of 10 g. of 1-(2,4-dinitrophenyl)-4-phenylpyridinium chloride in 60 ml. of ethanol and the solution was heated under reflux for 6 hours. The solution was cooled in ice-water. 6.9 g. of the insoluble 2,4-dinitroaniline filtered off, and the filtrate concentrated to a small volume under reduced pressure. Dilute hydrochloric acid was added to the solution until it was acid to congo red. A concentrated solution of mercuric chloride was then added to the solution until no further precipitation occurred. Hydrogen sulphide was passed into a suspension of the precipitate in water, until all the precipitate had dissolved. The solution was filtered to remove the mercuric sulphide and the filtrate was concentrated to a small volume under reduced pressure. Upon cooling 2.9 g. of 1,4 diphenylpyridinium chloride, M.P. 240–245° C. crystallised as colourless needles. Recrystallisation of the product from isopropyl alcohol yielded 2.5 g. of 1,4-diphenyl-pyridinium chloride, M.P. 246–8° C.

EXAMPLE 19

Preparation of 4-phenyl-1-(2-propynyl) pyridinium bromide 10.3 g. of a mixture of 4-phenyl pyridine, 7.5 ml. of propargyl bromide and 50 ml. of methyl ethyl ketone was allowed to stand at room temperature overnight. The dark brown solid which separated out was filtered off, washed with methyl ethyl ketone and was recrystallised from ethanol to give 3.31 g. of a chocolate-brown solid, M.P. 252–3° C.

EXAMPLE 20

Preparation of 1-(2-hydroxyethyl)-4-phenyl-pyridinium bromide 3.23 g. of 2-bromoethanol was added to a solution of 4.0 g. of 4-phenylpyridine in 50 ml. methyl ethyl ketone and the solution was distilled under reflux for 4 hours. The solvent was distilled off under reduced pressure, and recrystallisation of the resiue from isopropanol gave 4.5 g. of 1-(2-hydroxyethyl)-4-phenylpyridinium bromide, M.P. 136–138° C.

We claim:
1. 1-acetonyl-4-phenylpyridinium chloride.
2. 1-carboxymethyl-4-phenylpyridinium bromide.
3. 4-(4-chlorophenyl)-1-methylpyridinium iodide.
4. 1-(1-phenethyl-4-chloro-2,5-dioxo - 3 - pyrrolin - 3-yl)-4-phenylpyridinium chloride.
5. 1-carboxymethyl-4-phenylpyridinium bromide ethyl ester.
6. 4(3,4-dimethoxyphenyl) - 1 - methyl pyridinium iodide.
7. 1(2-phenoxyethyl)-4-phenylpyridinium bromide.
8. 1-[2-(diethylamino)ethyl]-4-phenyl pyridinium chloride.
9. 4(3,4-dihydroxyphenyl)-1-methyl pyridinium chloride.
10. 4-phenyl-1-(2-propynyl)pyridinium bromide.
11. 1-(2-hydroxyethyl)-4-phenylpyridinium bromide.

References Cited

UNITED STATES PATENTS 2,847,414   1958   Schmidle et al. _____ 260—290

OTHER REFERENCES

Sheinkman et al., J. Gen. Chem. U.S.S.R., vol. 33, pp. 1964–69 (1963).

Sheinkman et al., Vestmik Mosk. Univ. Ser. II Khim, vol. 19, pp. 74–82 (1964).

Chem. Abst., vol. 49, cols. 321–22 (Lukes et al. article), 1955.

Makin et al., J. Org. Chem. U.S.S.R., vol. 1, pp. 640–43 (1965).

Noller, Chemistry of Organic Compounds, 2nd ed., p. 140 (1957) QD253N65.

Van Hove, Soc. Chim. Belg. Bull., vol. 68, pp. 65–84 (1959).

Kolomoitsev et al., Akad. Nauk. Ukr. SSR, vol. 25, pp. 58–67 (1963).

Kobayashi et al., Tetrahedron, vol. 20, pp. 2055–58 (1964).

HENRY J. JILES, Primary Examiner

H. I. MOATZ, Assistant Examiner

U.S. Cl. X.R.

260—295, 296, 297; 424—263